(12) United States Patent
Blazina

(10) Patent No.: US 6,512,199 B1
(45) Date of Patent: Jan. 28, 2003

(54) CONSTANT-SPEED MOTOR-DRIVEN MODULAR WELDING APPARATUS WITH ELECTRONIC POWER CONTROL APPARATUS, ELECTRODE HOLDER OPERATION CONTROLS, AND SAFETY INTERLOCK

(76) Inventor: Anthony M. Blazina, 330 Club Springs Rd., Elmwood, TN (US) 38560

( * ) Notice: Subject to any disclaimer, the term of this patent is extended or adjusted under 35 U.S.C. 154(b) by 0 days.

(21) Appl. No.: 09/467,229

(22) Filed: Dec. 20, 1999

(51) Int. Cl.[7] ................................................. B23K 9/10
(52) U.S. Cl. ....................................... 219/133; 219/132
(58) Field of Search ............................. 219/133, 130.1, 219/130.51, 132, 134, 137 PS

(56) References Cited

U.S. PATENT DOCUMENTS

| | | | | |
|---|---|---|---|---|
| 2,658,132 A | * | 11/1953 | Welch | 219/132 |
| 3,593,121 A | * | 7/1971 | Jones | 219/133 |
| 4,539,486 A | * | 9/1985 | Saito et al. | 219/134 |
| 5,734,147 A | * | 3/1998 | Bunker et al. | 219/133 |

* cited by examiner

Primary Examiner—Clifford C. Shaw

(57) ABSTRACT

A motor-driven, modular, constant current DC arc welding apparatus configurable for use with consumable or non-consumable electrodes, consisting of: 1) a single, or multiple, electrically inter-connectable, power generating alternator modules fitted with full wave rectifiers, which when interconnected can achieve very high welding currents, exceeding 600 amps.; 2) an electronic power control apparatus which provides infinitely adjustable output current, even while welding, over a wide linear range; 3) a remote control system which place operator controls in the electrode holder, which includes a power boost feature to facilitate arc starting under difficult conditions, and which can be configured for a plurality of welding methods and job specific requirements; 4) an integral operator safety interlock which also greatly reduces waste heat generation; and 5) an improved high frequency DC welding current which tolerates wide variations in arc to workpiece distance without detrimental effects to the weld joint produced, and which provides greater than normal penetration for a given welding current.

5 Claims, 5 Drawing Sheets

CONSTANT-SPEED MOTOR-DRIVEN MODULAR WELDING APPARATUS WITH ELECTRONIC POWER CONTROL APPARATUS, ELECTRODE HOLDER OPERATION CONTROLS, AND SAFETY INTERLOCK

BACKGROUND—FIELD OF INVENTION

This invention relates to a compact, modular, constant current DC arc welding apparatus of the consumable electrode type (DC Stick and/or MIG) which is also capable of providing welding current for a non-consumable welding process (TIG) which is designed to be attached to, and to be directly or indirectly driven by, any suitable drive motor. Suitable drive motors include, but are not limited to, internal combustion engines, hydraulic motors, pneumatic motors, and electric motors. The modular welding apparatus of this invention generates welding current by means of a specially constructed high-current alternator, hereinafter referred to as a welding power generator, an electronic power control apparatus, and a remote operator control apparatus.

This invention produces a DC welding current with a pulsating high-frequency ripple component, hereafter referred to as high frequency DC welding current, which provides a number of improved technical welding characteristics. For example, this high frequency DC welding current can be transmitted over relatively long distances when compared to a pure DC current, with much less power loss due to the resistive and inductive effects of transmission cables, reducing the usual need to increase welding cable cross sectional size when using longer welding cables. This high frequency DC welding current also enables a weldor to produce very high quality welds, which show greater penetration into the workpiece for a given power setting when compared with prior art. The high frequency DC welding current also produces an exceptionally easy to start and easy to maintain welding arc which can be used successfully, without weld degradation, over a very wide range of arc to weld puddle lengths, including use with the electrode placed in direct contact with, or within, the weld puddle itself. Because of its ability to maintain a suitable welding arc with the electrode placed within a weld puddle, completely isolated from atmospheric and other external impurities, the high frequency DC welding current generated by the invention produces weld joints with less internal defects.

This invention's electronic power control apparatus works in conjunction with the invention's power generating apparatus to generate a very precisely controlled welding current output without the need for either precise control of drive motor speed, or a complicated electrical or mechanical power control system which relies on output power sensing or any sort of electrical or mechanical feedback. The invention's electronic power control apparatus also provides a means to control the electrical and operational characteristics of the aforementioned high frequency DC welding current.

The invention also incorporates a complete set of welder operation controls (i.e., power on/off, output amperage, arc starting, momentary power boost) which are integrated ergonomically into the invention's electrode holder, eliminating the need for a weldor/operator to leave a work location to make any adjustments to the welding power generating apparatus. A safety interlock is also included in the invention's control apparatus to provide additional weldor/operator safety.

The modular design of the invention's power generating apparatus and its electronic power control apparatus allow a plurality of individually operated, and independently controlled, compact, modular, constant current DC arc welding apparatuses to be attached to, and powered by, a single drive motor without any undesirable interaction between the individual components.

Further, the invention's compact, modular, welding power generator and its electronic power control apparatus also make it possible for a plurality of separate welding power generators to be attached to, and driven by, a single drive motor, with their welding current outputs connected in parallel, and with all of the interconnected welding power generators controlled by a single electronic power control apparatus without any undesirable interaction between the individual components. Thereby providing a means to generate, and to precisely control, very high welding currents (i.e., from 300 to over 800 amps.) with a very high degree of efficiency, and at a very low manufacturing cost, when compared with any prior art. For example, conventional motor-driven high-amperage welders must be very massively constructed to operate reliably and to provide a means to dissipate high internal heat generated while producing large welding currents. It is easy to see, therefore, the great advantage provided by the modular aspects of this invention, when compared to prior art.

This invention, because of its compact size and modular construction, is also universally retrofittable into any motor driven vehicle (i.e., tractors, automobiles, trucks, construction equipment, mowing equipment, nursery equipment, mining equipment, logging equipment, military equipment, all-terrain vehicles, amphibious vehicles, and water-craft), thereby creating a new class of welding equipment.

BACKGROUND—DESCRIPTION OF PRIOR ART

Electric arc welding requires a relatively high power current source. In the case of mobile and/or portable welders, this power source typically consists of a motor driving a DC generator or an alternator. Given the high weight, and expense of DC generators, most modern motor driven welding devices utilize an alternator as the power source. This power source must generate sufficient AC or DC current to melt welding electrodes that range from 1/16 to 5/16 inch in diameter and are 9 to 18 inches in length. The power source must also be able to provide sufficient voltage to start, and to maintain, an electrical welding arc. Normally the arc welding power source has two terminals. One terminal is connected via a flexible cable to the work piece to be welded, and the other is connected via a second flexible cable to an electrode holder. The electrode holder is an insulated metal clamp supported by an insulated handle which is gripped by the equipment operator.

Particularly with DC welders, the size and length of the flexible electrical cable used to connect the arc welding source to the workpiece and to the electrode holder is of critical importance, requiring larger and larger cable sizes as the distance from the welder to the workpiece increases. As cable size and/or length increases, equipment cost increases, utility of the equipment decreases, and workload placed on weldors operating the equipment increases.

Consumable electrodes are typically used with electric arc welding equipment.

Approximately one inch at one end of the welding electrode is bare metal to insure good electrical contact when it is gripped by an electrode holder clamp. The remainder of the electrode is coated with various chemical formulations (fluxing agents, arc stabilizers, metal powders, and other substances). These coatings exhibit little insulating effect and when a weldor grips an electrode and places it into the jaws of the electrode holder, the weldor is at considerable risk of electrical shock. Since a welding electrode is consumed in about three minutes, many electrode changes may be required to complete a job. Each change of electrode provides a risk of electrical shock. As time passes, a weldor's gloves to grow damp with perspiration, greatly decreasing any insulating effect that these gloves may provide. Weldors are, therefore, frequently shocked. On most occasions this shock is simply painful, but under the right circumstances, this shock may be fatal or disabling.

There have been a number of systems designed to better control a welding power source (as described, for example, in U.S. Pat. No. 4,216,368, and U.S. Pat. No. 5,864,117), but their technical deficiencies, and/or their high expense, have prevented their general acceptance and widespread use, particularly in lower-cost general purpose welding equipment. Further, none of these control systems have been particularly applicable to motor-driven welders designed to operate away from electrical utility supplied AC power. For example, in prior art, welding power control and/or welding power regulation systems most typically require some form of electrical and/or mechanical feedback to the control circuits and/or engine governing systems used by these devices to produce well regulated constant current and/or constant voltage welding output. Therefore, most welding, particularly welding which uses motor-driven alternators for a welding power source, is often done without having efficient, and/or accurate, and/or low cost control of the welding current transmitted to the electrode holder.

Another example of prior art, U.S. Pat. No. 2,658,132, describes a control system for a constant speed electric motor driven DC generator which used expensive saturable reactors, transformers, and relays to control DC generator output and which utilized relay control of the electric motor and a rotor control power supply transformer to switch power on and off. Yet, for all the complexity of this design, it fails to provide a constant welding current output or a proper open circuit voltage across a wide range of output currents and it provides no means to deal with the effects of motor speed variations should such occur (as would be common in most motor driven welders).

In the past, designs for low-cost motor driven, alternator powered welding systems have attempted to utilize modified or unmodified automotive type alternators (used with or without other supplementary external power sources). Frequently, prior art, in its attempts to successfully generate welding current with alternators, has required expensive custom alternator designs, and/or complex custom transformers, and/or other design features that have often limited welding capabilities, and/or made the welders built with this prior art expensive, and/or difficult to mass produce. For example:

1. Prior art (such as that described in U.S. Pat. No. 4,853,557) which relies on complex external power control and/or switching devices have been primarily limited to under-hood automotive applications where the components can be somewhat protected from adverse environmental conditions. Often designs of this type even further limit the use of such prior art only to completely protected (dry, in-door/under cover) environmental conditions.

2. Prior art (such as described in U.S. Pat. No. 4,330,715 and U.S. Pat. No. 5,734,147), has often required the incorporation of complex feedback and/or auxiliary power increasing schemes, and/or external battery supplies (such as described in U.S. Pat. No. 5,506,492) which are designed to produce better welds when operating the alternator at rotational speeds which are inefficient for generating proper welding currents, or to compensate for design limitations which are inherent in standard automotive alternators which are not typically designed to produce high power for extended periods of time.

3. Prior art (as described in U.S. Pat. No. 5,670,070) well illustrates the level of complexity previously required to successfully use alternators as welding power sources. In this example, direct adjustment and control of stator output is the proposed solution. However, to implement this control system, complicated switching and timing circuitry as well as rather extensive internal wiring is required to enable the use of six (6) SCR's (Silicon Controlled Rectifiers) which replace standard alternator rectifiers, within a specially constructed alternator.

4. Prior art (as described in U.S. Pat. No. 3,593,121) has also required complicated multiple variable transformers or auto transformers mechanically linked to each other and to an electrical control means such as a potentiometer which are used in conjunction with a custom built alternator, with electrical performance and impedance characteristics matching those of the transformers or autotransformers noted previously, in order to achieve a stable alternator powered arc welding power source of the constant voltage type. However, it is ineffective for providing a constant current welding power supply of the type required for consumable electrode welding (i.e., DC stick or MIG).

5. Prior art frequently utilizes adjustment of the driving motor speed as a primary method of welder power control. When used without complicated and expensive speed governing equipment, a highly undesirable result of this type of control is to force a welder/operator to deal with dramatically differing welding characteristics caused by nonlinear and often large variations in output power caused by drive motor speed variations which occur under a widely varying load.

For example, going from no arc to a fully developed high current welding arc may place an extreme load on the drive motor and reduce welding output just when a stable or even an increased output is most critically required. This makes arc starting difficult even at higher amperages. However, when working with welding currents of less than 90 amps. alternator output voltages are typically too low, even if operating in a stable fashion, to achieve an easy to start and easy to maintain welding arc.

6. Prior art has also neglected to deal effectively with the excessive heat build-up in the alternator's stator windings and core and the resulting potential for premature electrical failure that may occur whenever an alternator's field is excited without an electrical load being placed on the alternator for extended periods of time, as occurs typically in devices based on prior art.

7. Prior art has been unable to efficiently and to properly utilize varying sizes of consumable welding electrodes without the use of relatively complicated electronic power and voltage regulating circuitry. Nor has it dealt with the need to reliably strike an arc to begin welding. Typically, alternator powered welding equipment does not generate sufficient voltage for arc generation except at higher engine speeds and higher (over 90 amperes) welding currents. For example, to weld with a smaller diameter electrode in a welder that relies on engine speed power control, engine speed would have to be very high to start an arc then drop almost instantly to a predetermined set speed for actual welding. U.S. Pat. No. 5,861,604 has offered a complicated, expensive, and relatively unreliable method of dealing with this problem in non-motor-driven welding equipment. But it is not readily applicable to alternator based motor-driven devices.

8. Prior vehicle engine driven alternator powered welding systems have required precise speed control to provide proper welding current output requiring either expensive engine speed governing devices or special operator-adjustable throttle controls to provide proper control of welding power. Because engine speed cannot change instantaneously, when using these types of controls, effective variation of welding power is not possible while welding, greatly limiting the ability of this type of welder to perform in commercial welding applications.

9. Prior vehicle engine driven alternator powered welding systems have required very large power generating apparatus with the physical size being determined by the output power required and by the need to dissipate significant amounts of internal heat within the body of the generating apparatus. For example, a power generating apparatus which would produce 300 amps. of continuous welding power would have to be approximately 2.5 times as large physically as a power generating unit capable of producing 150 amps of continuous welding power. In some cases, expensive liquid cooling systems have been utilized to control welding power generator waste heat.

In the past, alternator powered welding apparatus controls have been typically attached somewhere near, but external to, the power generating apparatus of the welding device. Typically these controls fall into two categories, engine speed controls and/or electronic controls that vary alternator operation. These controls are used to adjust the output power of the arc welder to meet the technical requirements of the job that is being attempted by the weldor and on/off control of the device itself.

For example, in order to successfully weld a material of a given thickness, the use of such alternator powered welding equipment requires the weldor/operator of the equipment to select output power via engine speed control to produce a proper weld when considering material thickness, ambient temperature, type of weld shielding (gas or chemical), thickness of electrode(s), condition of material being welded (clean or oxidized), and the expected or desired speed of weld bead deposit on the work piece. Frequently this welding power selection is accomplished through a trial and error process, particularly since precise control of engine speed is very difficult to accomplish in ungoverned vehicle engines. Since the work piece is often some distance from the power generating equipment, travel to and from the welding device is a time and effort wasting process. To solve this, some designs have utilized remotely adjustable engine speed control mechanisms that allow engine speed adjustment from a remote location. However, mechanical limitations constrain such remote controls to operation over relatively short distances (10–20 ft.). If longer welding cables are utilized and/or required, time wasting travel to and from the mechanical engine speed adjustment mechanism to the work site will still be required. Designs of the sort described in U.S. Pat. No. 4,216,367 have addressed this issue in the past.

On/off control of alternator powered welding equipment in prior art has also typically been accomplished at or near the power generating device. Since power is applied to the welding electrode when the device is switched on, extreme caution must be taken by the equipment operator to insure that the welding electrode is positioned and held in such a way as to insure that no inadvertent contract between the electrodes and a metal surface can occur while the weldor/operator is adjusting controls and preparing to weld. Further, since power is applied continuously to the welding electrode, when working in confined spaces, the weldor/operator must exercise extreme caution when positioning the welding electrode prior to beginning a weld. For example, should inadvertent contact with a metal surface occur an electrical arc can occur in such a way as to damage the weldor/operator's eyesight. to cause an explosion, or to cause the weldor/operator to incur severe burns. Designs of the sort described in U.S. Pat. No. 4,151,396 have addressed this in the past with rather complex, and potentially unreliable electronic controls.

U.S. Pat. No. 2,658,132, describes a system of remote controls conveniently mounted within the electrode holder which is part of a welding system made up of an electrical control means, a large AC motor, and a DC generator. These controls provide a mechanism for controlling the DC generator's output power and for turning said DC generator on and off. However, the effect of these controls on the DC generator is not immediate and, because of residual magnetism in the DC generator's components which may still be rotating even after welding power is switched off, power sufficient to produce a dangerous arc may still be generated even though an operator believes the power to be switched off. This limitation makes these controls ineffective as a safety device. Further, motor startup delay in this design causes a corresponding delay in the production of usable welding power by the DC generator when an operator switches power on. This can produce unpredictable and potentially dangerous results when an operator is attempting to use the on/off control on the electrode holder as a safety device. Given the limitations noted, it is not surprising that claims relating to the use of the control means defined in this invention as either an operator safety mechanism, or as a means to prevent unwanted waste heat generation in the DC generator during periods when welding is not taking place, were not made.

Prior art relating to low cost alternator powered welding equipment has often opted for manual engine speed control to achieve proper power output for a given welding job. While low in cost, welding system efficiency and welding quality is typically poor when this approach is used. A number of factors combine to cause this. For example, alternator output power does not vary in a linear relationship with alternator rpm, and at the higher end of the alternator output curve, small variations in speed may produce rather large variations in output power. Since variations in output power demand, such as those caused by welding, increase or decrease the load placed on the engine by the alternator, and to a varying degree the engine speed, one can see that fine control of power becomes almost impossible. Additionally, alternator output power increases or decreases as internal temperatures increase or decrease. These temperature variations can occur as a result of welding, or as a result of simply generating welding energy. As these factors combine, constant compensating speed adjustments by the operator is required. To a large degree, power generation capability and utility, for a given mobile welding apparatus which uses an alternator to generate welding power without very sophisticated control mechanisms, is determined to a large degree by the physical size of the welding power generator itself and its ability to maintain relatively constant internal temperatures even while it is being operated at speeds which may provide very inefficient cooling, particularly when output power demand is high. This is a significant drawback in the case of retrofittable mobile welding systems, particularly in applications, where installation space is at a premium.

Prior art relating to alternator powered welding systems in which multiple weldors may simultaneously utilize a single engine as a power source to drive a plurality of independently controlled welding power generators is illustrated in U.S. Pat. No. 4,539,486. This patent proposes a solution in which a rather large, and expensive to produce, specially designed alternator is used in which a plurality of generator elements are combined and incorporated within a single welding power generator. Because magnetic and electrical interaction between the separate components of the generator cause undesirable effects during system operation, complicated electronic circuits are required to compensate for these effects. And, as with other prior art noted herein, constant current output is only attained by means of control circuitry requiring a means of electronic feedback. Further, in this invention, no means of combining and controlling the individual outputs of the individual generator elements in order to produce higher welding currents is possible.

In view of the foregoing problems, and as a weldor, and a designer of welders, the inventor has determined a complete gelding apparatus which can be driven by any suitable drive motor including but not limited to, internal combustion engines, hydraulic motors, pneumatic motors, or electric motors. This invention achieves very low manufacturing costs when compared to any prior art and includes features which allow it to be used effectively in commercial welding endeavors anywhere in the world, including areas in which no electrical power or technological support is available to a weldor/operator. The invention includes, in the embodiment described herein, a specially constructed alternator but it can also function acceptably using modified high-current automotive alternators. The invention also includes an electronic control mechanism which provides precise control of output power and voltage without the need for any expensive or complex feedback circuitry, and which enables the use of inexpensive remote operator controls which are, in the embodiment described herein, incorporated into a welding electrode holder. Operator controls may also be incorporated into any sort of remote control device suitable to the operator and the job to be performed (i.e., foot operated controls, a belt mounted control mechanism, other hand controls, infrared controls, etc.). These components work efficiently together to produce a welding energy unlike that of previous alternator-based welding devices with measurably superior welding performance characteristics. The invention's wide range of potential control configurations make it easy to provide an operator with ergonomically designed user controls designed to greatly reduce weldor/operator workload as well as eliminating inadvertent shock and eye damage hazards for the weldor/operator in an absolute and essentially foolproof manner. In the embodiment of the invention specifically described herein, the operator controls include a welding output power control means so designed as to insure that no welding energy is present at the electrode holder, or in any part of the power generating and power transmitting means, at any time that welding is not actually taking place.

The invention produces a welding energy which can be transmitted over relatively long distances without the need to increase welding cable size and which offers greatly improved technical welding characteristics that enable a weldor to produce very high quality welds which show greater penetration into the workpiece for a given power setting than was previously possible while producing an easy to maintain arc even when a weldor places the welding electrode in direct contact with the weld puddle. Because of its ability to produce a stable arc deep within a weld puddle, the invention produces welds with less impurity within the weld joints which it produces than attainable with prior art.

Unlike prior art, the operation and control of the invention does not require precisely governed and/or regulated engine speed control.

The invention's modular welding power generators can be operated and controlled independently, without undesirable electrical or magnetic interaction, when attached to, and powered by, a single drive motor. Further, the design of the invention's independent modular welding power generator and its electronic control system, permits multiple welding power generators to be attached to a single drive motor with their outputs connected in parallel, while being controlled by a single electronic control mechanism, thereby enabling very high welding energy (i.e., from 300 to over 600 amps.) to be efficiently generated and precisely controlled at a very low manufacturing cost when compared with any previous technology.

SUMMARY—RAMIFICATIONS, AND SCOPE

This invention relates to a high frequency pulsed DC arc welding apparatus of a type which uses one, or more, electrically and mechanically inter-connectable and electronically controlled alternators, referred to herein as modular welding power generators, which are designed to be driven by a suitable drive motor. Said drive motors include, but are not limited to, internal combustion engines, hydraulic motors, pneumatic motors, or electric motors.

The welding power generators defined by this invention produce a welding energy suitable for use with all types of consumable electrodes (DC Stick and/or MIG) or non-consumable electrodes (TIG). These modular power generating units are electronically controlled and are so constructed as to be attached to or retrofittable to any type of drive motor (including engine driven vehicle such as tractors, automobiles, trucks, construction equipment, mowing equipment, nursery equipment, mining equipment, logging equipment, military equipment, and water-craft), or to be powered by any other type of suitable motor, including, but not limited to, internal combustion, electric, pneumatic, or hydraulically driven motors, which utilizes an ergonomically designed electrode holder incorporating a complete set of operator controls which are built into said electrode holder, which is capable of reliable operation in adverse environmental conditions, and which can produce an infinitely variable range of constant DC welding currents, at both standard and reverse polarities, without significant change in output (arc producing) voltage.

Invention features include:
1. a modular electronic control apparatus which includes in its design: an ergonomically configured welding electrode holder with welder operation controls built into the handle of the electrode holder, a control interface cable which is part of the welding cable assembly, and an electronic control module which is built into, or attached to, the invention's alternator-based modular power generating device,
2. an air or fluid cooled alternator-based/power generating assembly designed to be motor driven and to operate continuously, at its maximum rated power, within a wide operating speed range defined to insure maximum effectiveness of its designed cooling system at all times when operating within this speed range, utilizing electronic controls rather than motor speed control to precisely, reliably, and inexpensively, control welder output current, without the need for electronic sensing and/or feedback of output current, and without the need for electronic or mechanical sensing and/or feedback of welding power generator or drive motor speed, 3. a solid-state electronic welding power control apparatus which provides a weldor with an infinitely, and instantaneously variable, range of well regulated output welding current settings without the need to vary drive motor speed or welding power generator speed, and without significant change in output (arc producing) voltage, 4. a solid-state electronic welding power control apparatus which provides a weldor with an infinitely, and instantaneously variable, range of well regulated output welding current settings and appropriate output (arc producing) voltages settings to insure proper welding arc function utilizing electronic controls rather than motor speed control to precisely and inexpensively, control welder output current, without the need to incorporate any mechanism for electronic sensing and/or feedback of output current, and without the need to incorporate any mechanism for electronic or mechanical sensing and/or feedback of welding power generator or drive motor speed, 5. a welding apparatus which is designed to operate outdoors in all climates including wet and/or otherwise adverse conditions, 6. a welding apparatus with inherent operator safety features, made possible by the invention's electronic control system, which act positively and reliably to prevent inadvertent applications of welding energy which can cause injury to eyes, burns, or potentially lethal electrical shock to operators, 7. very compact, modular welding apparatus components which contribute significantly to the ease with which the invention can be installed into a given vehicle, or be attached to a given motor, 8. high (150 to over 800 amp.) continuous (100%) duty regulated welding current output, 9. a capability to replace existing vehicle electrical generating equipment in an emergency or when installation space is limited, 10. a capability for the power generating equipment and associated electronic controls to be utilized as a power source for TIG welding equipment, and 11. a low-parts count modular design which yields both high reliability and very low manufacturing costs, 12. a welding current generating system which incorporates a pulsating high frequency ripple component with a very well regulated constant DC welding current to produce a very stable and easy to maintain welding arc which produces good welding characteristics over a relatively wide range of arc lengths for a given electrode size (from 0 to over 2 times electrode diameter) and which provides significantly greater penetration, and produces significantly less weld joint impurities, when compared to a DC welding current without the pulsating high frequency ripple component.

Specifically, when comparing the invention to prior art, the invention greatly improves operator safety, significantly reduces weldor/operator work load, simplifies the welding process, simplifies product installation, offers all-weather utility, and dramatically improves weld quality over equivalent equipment at a significantly lower manufacturing cost than is possible with prior art known to the inventor.

Note that the complete scope of the invention should be determined by the appended claims and their legal equivalents, rather than by the examples given.

SUMMARY—OBJECTS AND ADVANTAGES

It is an object of the present invention to:

1. Provide an improved motor driven arc welding apparatus.

2. Provide a device which can easily be retrofitted to any existing vehicle engine, or to other suitable motors (including air and hydraulically driven motors), so as to use said engine/motor power to inductively generate appropriate welding currents.

3. Generate, by means of a specially constructed alternator, controlled by an electronic control means, and operated within a pre-defined speed range, a DC welding power output with a high frequency pulsating ripple component, in either standard or reversed polarity, which can be sustained without degradation, or equipment failure, in continuous use (100% duty cycle) situations.

4. Overcome all of the control and safety shortcomings in prior art, as noted previously herein.

5. Provide a weldor/operator with an unprecedented degree of real-time personal control over the complete welding process.

6. Provide a welding apparatus with an infinitely adjustable DC welding power source which (when used by an experienced weldor/operator) will significantly reduce weld impurities, increase weld penetration for a given power setting, and significantly improve weld appearance and quality when compared to prior art.

7. Provide a means to easily incorporate ergonomically designed operators controls, such as the electrode holder control system fully described in the embodiment of the invention which is described herein, which includes a complete set of welding apparatus controls, thereby significantly reducing operator workload and increasing weldor/operator safety.

8. Provide safety features which greatly reduce electrical shock hazards for the weldor/operator by insuring that no welding energy is produced unless appropriate conditions are met.

9. Provide a welding apparatus which can manufactured at a lower cost than any other welding device or apparatus which relies on prior art, without sacrificing the above identified performance features.

10. Utilize the same power generation source to weld with consumable stick-type electrodes, to weld with a wire feed type of consumable electrode (MIG) welding, or to provide a power source for non-consumable electrode (TIG) welding.

11. Generate precisely controlled welding current without the need for precise engine speed control or any sort of complicated power regulation circuitry which relies on mechanical or electrical feedback.

12. Allow multiple welding power generators, which are compact in size and inexpensive to produce when compared to large conventional motor-driven welding power generators, to be attached to a driving engine with their outputs connected in parallel while being controlled by a single electronic control mechanism, thereby enabling very high welding energy (i.e., from 300 to over 800 amps.) to be efficiently generated and precisely controlled at a very low cost when compared with any previous technology.

13. Allow more than one welding apparatus to be attached to the same engine and yet to be operated independently by multiple weldors.

The foregoing objectives have been achieved as will be seen in the detailed description of the invention which follows. Additional objects, features, and advantages of the invention will also become apparent.

DESCRIPTION OF DRAWINGS/FIGURES

In the drawings, closely related figures have the same number but different alphabetic suffixes.

Figure 4:
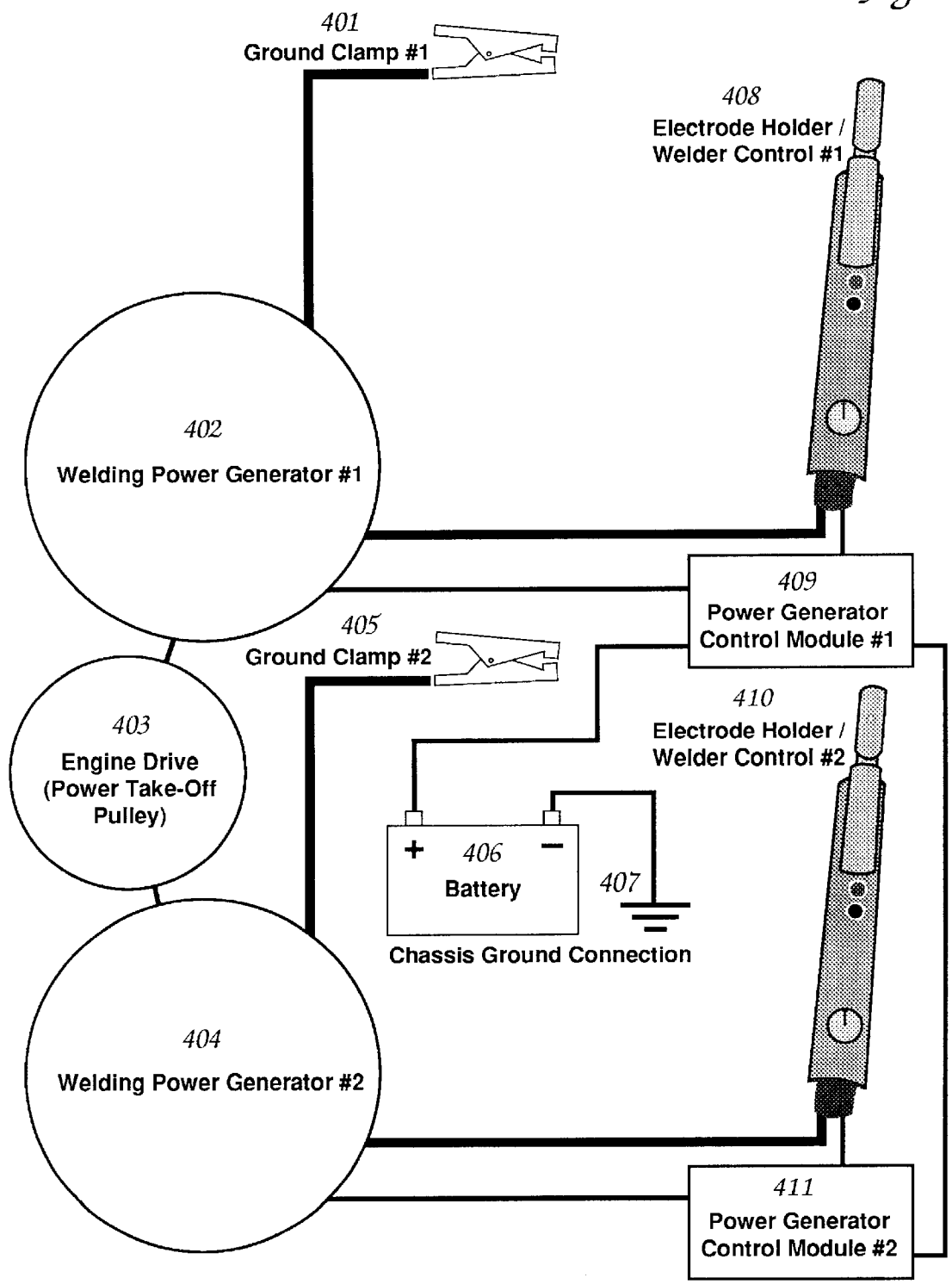
Figure 5:
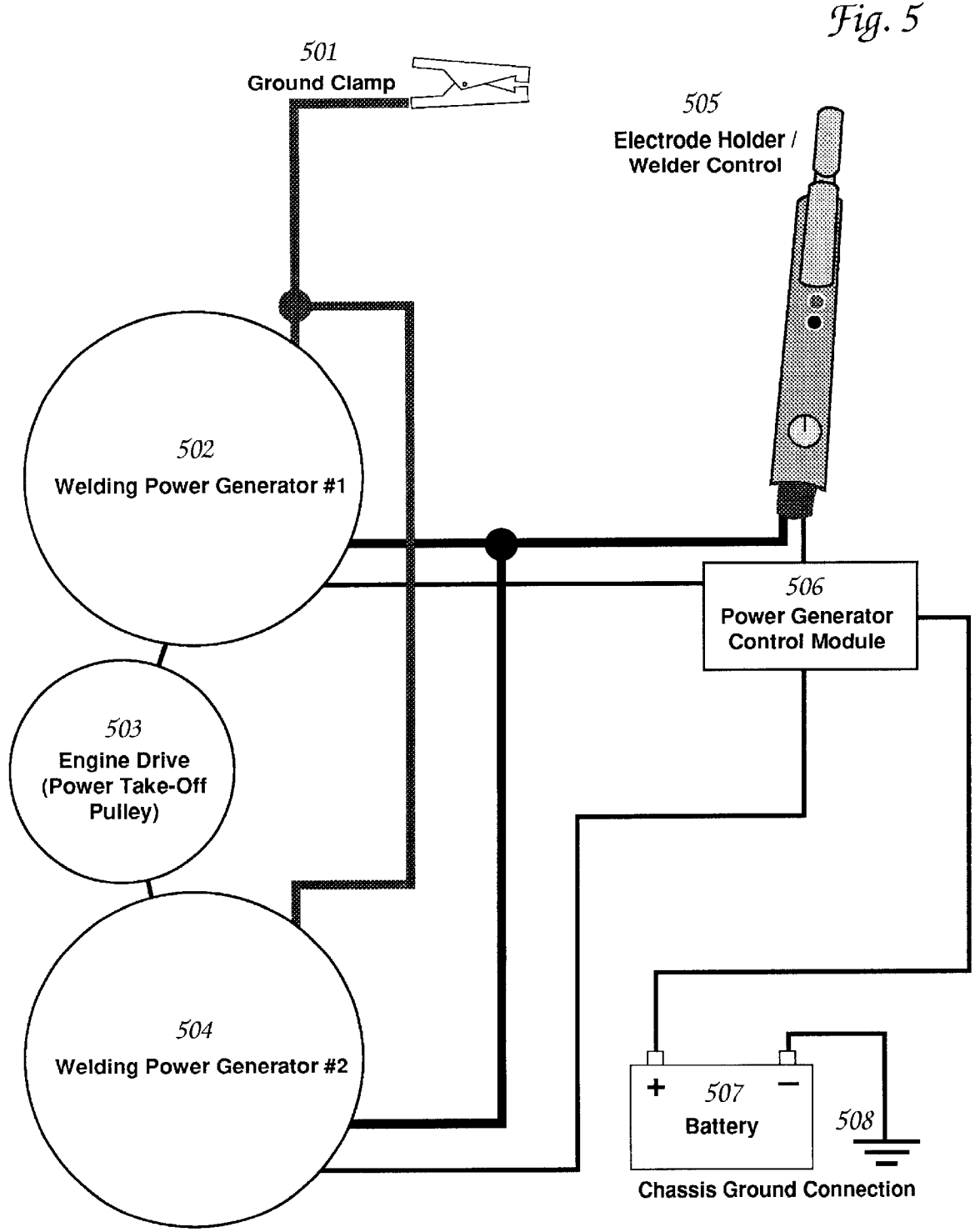

FIG. 4 is a functional block diagram which illustrates a typical embodiment of the present invention where more than one independently controlled welder is attached to a single engine FIG. 5 is a functional block diagram which illustrates a typical embodiment of the present invention where more than one welding power generator is attached to a single engine and connected so as to produce a multiplied welding power output.

REFERENCE NUMERALS IN DRAWINGS

FIG. 1:

| | |
|---|---|
| 101 | Drive Motor (Power Take-Off) |
| 102 | Stator Assembly |
| 103 | Rectifier Assembly |
| 104 | Rotor Assembly |
| 105 | Welding Power Generator |
| 106 | Ground Clamp |
| 107 | Electrode Clamp |
| 108 | Boost Button |
| 109 | Power Control Dial |
| 110 | Power Button |
| 111 | Insulated Handle |
| 112 | Combination Electrode Holder/Welder Control |
| 113 | Power Generator Control Module Assembly |
| 114 | Battery |
| 115 | Battery Ground Connection |

FIG. 2:

| | |
|---|---|
| 200 | Power Button |
| 201 | Boost Button |
| 202 | Dual Timing Circuit |
| 203 | Power Control Potentiometer |
| 204 | Common Timing Circuit Resistor |
| 205 | Timer Integrated Circuit |
| 206 | Bypass Capacitors |
| 207 | Timing Capacitor |
| 208 | Timer Output Test Point |
| 209 | Timer Output |
| 210 | Electrode Holder Controls |
| 211 | Bias Resistor |
| 212 | Battery |
| 213 | Power Supply |
| 214 | Flywheel Circuit Capacitor |
| 215 | N-Channel High Power, High Speed, Low Resistance Bypass MOSFET |
| 216 | Rotor |
| 217 | N-Channel High Power, High Speed, Low Resistance MOSFET Switches |
| 218 | Stator |
| 219 | Three-Phase Bridge Rectifier Assembly |
| 220 | Electrode Holder |
| 221 | Ground Clamp |
| 222 | Output Waveform |

FIG. 3:

| | |
|---|---|
| 301 | Electrode Clamp |
| 302 | Boost Button |
| 303 | Power Control Dial |
| 304 | Power Button |
| 305 | Insulated Handle |

FIG. 4:

| | |
|---|---|
| 401 | Ground Clamp #1 |
| 402 | Welding Power Generator #1 |
| 403 | Engine Drive (Power Take-Off Pulley) |
| 404 | Welding Power Generator #2 |
| 405 | Ground Clamp #2 |
| 406 | Battery |
| 407 | Chassis Ground Connection |
| 408 | Electrode Holder/Welder Control #1 |
| 409 | Power Generator Control Module #1 |
| 410 | Electrode Holder/Welder Control #2 |
| 411 | Power Generator Control Module #2 |

FIG. 5:

| | |
|---|---|
| 501 | Ground Clamp |
| 502 | Welding Power Generator #1 |
| 503 | Drive motor (Power Take-Off) |
| 504 | Welding Power Generator #2 |
| 505 | Electrode Holder/Welder Control |
| 506 | Power Generator Control Module |
| 507 | Battery |
| 508 | Chassis Ground Connection |

DESCRIPTION OF INVENTION

A typical embodiment of the present invention is illustrated in FIGS. 1 through 5.

Figure 1:
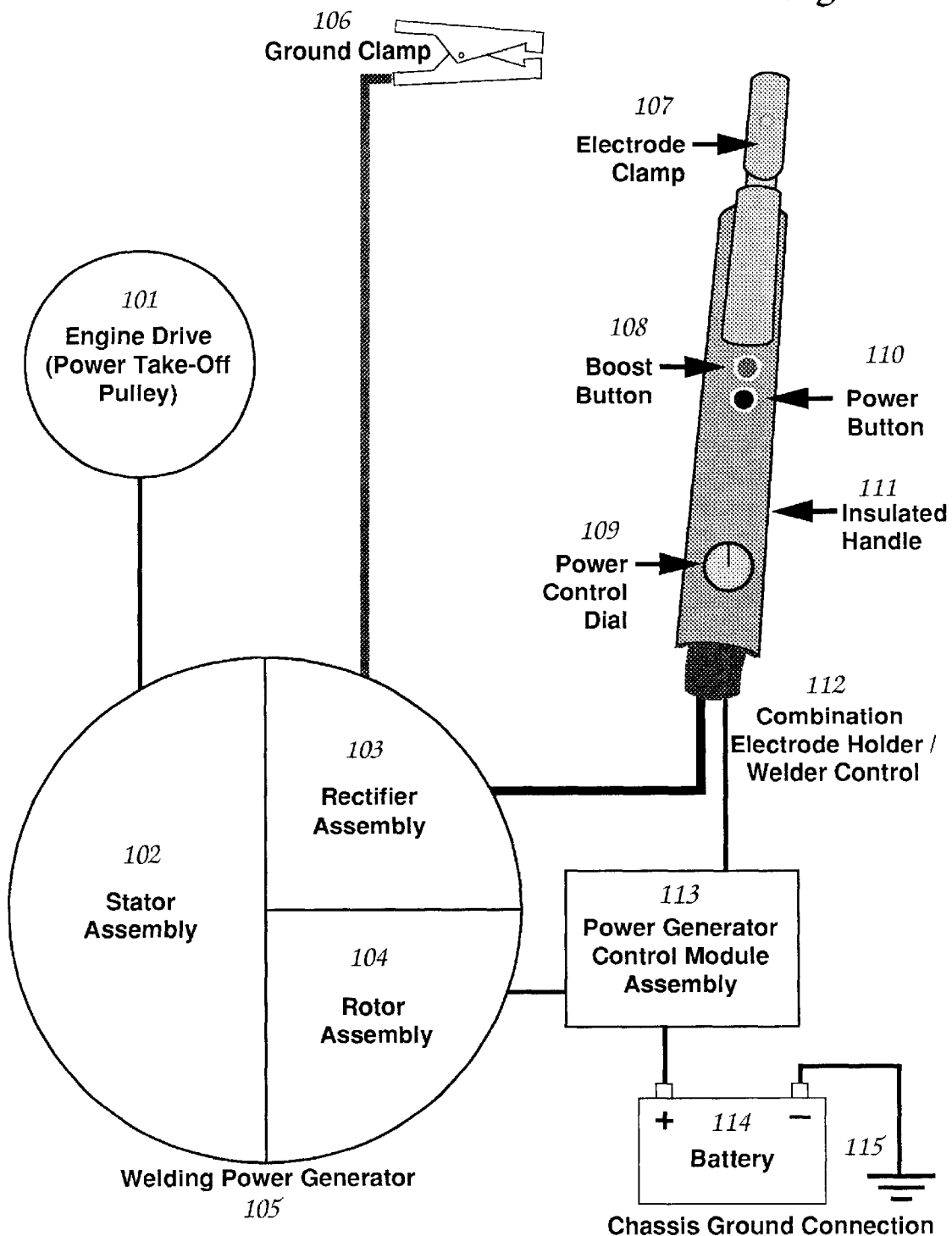
FIG. 1 is a functional block diagram which illustrates a typical embodiment of the present invention, its various major component parts, and its improved welder controls.

A functional block diagram of the present invention is shown in FIG. 1. Rotary drive comes from the Drive Motor (101) which drives a specially constructed alternator, hereinafter referred to as the Welding Power Generator (105), either directly, or by means of a v-belt connected to pulleys, or by a gear drive means. Pulley or gear ratios are selected to insure that the Welding Power Generator (105) is driven to a speed ranging from a minimum of 6,000 rpm to higher speeds (hereinafter referred to as the Welding Speed Range) when the Drive Motor (101) is running at an efficient operating speed. No sophisticated speed governing mechanism is required. Drive Motor (101) speed may be allowed to vary continuously within this Welding Speed Range without any negative effect on the welding current output. Beyond this, precise control of the Drive Motor (101) speed is not required.

The Welding Power Generator (105) is made up of four major components, a Stator Assembly (102), a Rectifier Assembly (103), and a Rotor Assembly (104). All components used in the Welding Power Generator (105) are conventional in their design and form, enabling embodiments of the invention to be manufactured from components which readily available or which are easily fabricated to meet specifications noted herein, using conventional tooling by competent component suppliers. Unlike a standard automotive alternator which is designed to produce its peak power only for relatively short periods of time, in this invention, each of these components are constructed to operate continuously within the invention's Welding Speed Range. The Welding Speed Range may be unique for any given Welding Power Generator configuration and begins at the lowest speed at which maximum Welding Power Generator power output is generated and ends at the maximum rotational speed at which the Welding Power Generator's mechanical components can be operated continuously with no danger of mechanical failure. Throughout this Welding Power Range, output current remains constant, and no significant additional current output is generated, for a given Rotor Assembly (104) and Stator Assembly (102) combination, and a given maximum Rotor Assembly (104) current.

In the case of the Stator Assembly (102) and the Rotor Assembly (104), all copper windings are heavier in gauge than would be normal for an automotive application, and each is coated with insulating varnishes that can withstand continuously elevated operating temperatures exceeding 140° C. The Stator Assembly (102) is constructed with additional, or thicker, iron laminations, when compared with standard automotive alternators with similar power ratings. The Stator Assembly (102) which, in standard automotive alternators, is typically is made up of three (3) separate windings is, in this invention, constructed to have from six (6) to nine (9) separate windings with from two (2) to three (3) windings wired in parallel to increase the component's current generating capability. Further, in various embodiments of the invention, the Rectifier Assembly (103), which may be alternately housed within, or outside of, the Welding Power Generator (101) is constructed of components, six (6) diodes, ⁵⁄₁₆'(or larger) stainless steel power output connection terminals) which are sized, both physically and electrically, to dissipate and transmit at least two (2) times the rated welding current produced by the power generator, and to rectify at least three (3) times the rated maximum welding current produced by the individual stator windings. In addition to these components the Welding Power Generator (105) includes bearings, connectors, wires, and terminals necessary for its proper functioning.

The case of the Welding Power Generator's (105) Cooling Mechanism (116) is connected to Chassis Ground (115) for electrical shielding. However, neither the Stator Assembly (102) or the Rectifier Assembly(103) in the Welding Power Generator (105) are connected internally to an electrical ground point of any type. Because of the electrical isolation of these components, the Welding Power Generator's (105) output current may only be applied to the workpiece by means of the Combination Electrode Holder/Welder Control (112) and the Ground Clamp (106). This prevents inadvertent current flow while welding and also provides the advantage of enabling a weldor to utilize either reverse or standard welding polarity by appropriately connecting the Ground Clamp (106) and the Combination Electrode Holder/Welder Control (112) to the positive and negative output terminals of the Welding Power Generator (105). This electrical isolation also insures that welding, with either polarity, can be accomplished with total operator safety and without possibility of inadvertent damage to other components which may attached to the rotary drive source or to the rotary drive source itself. It further insures, when used in conjunction with the invention's Power Generator Control Module (113) and Combination Electrode Holder/Welder Control (112), against inadvertent electrical shock when working in wet or otherwise hazardous conditions.

The Power Generator Control Module (113) is used to control current flow in the Rotor Assembly (104) in such a way as to produce a constant open circuit (i.e., no welding arc established) voltage output from the Welding Power Generator (105) and a constant closed circuit (i.e., welding arc established) current output from the Welding Power Generator (105). Output current is infinitely adjustable by the weldor/operator and can be adjusted at any time, even while welding. This is accomplished, in this invention, by using a pulse width modulation technique to efficiently control Rotor Assembly (104) current, thereby assuring that, at any given point in time, either maximum current or no current is being sent to the Rotor Assembly (104). By rapidly switching the ratio of maximum rotor current (on time) to zero rotor current (off time), rotor current can be very precisely controlled, with a very high degree of precision. By operating the Welding Power Generator (105) continuously within the defined Welding Speed Range while generating welding current, and by controlling rotor current as described herein, the Welding Power Generator (105) operates in a mode where it is always generating its maximum rated output power, but where the percentage of time during which it is doing this, within a given time period, is precisely controlled and regulated. This condition of operation allows precise linear control of the Welding Power Generator (105) output current applied to a workpiece during arc welding and, further, the welding current so produced is completely self regulating, requiring no means of electrical or mechanical feedback to maintain a steady arc at any given output power setting. The resulting effect of this invention's system of generating and controlling output welding power is a fixed and unvarying output welding current for a given rotor current on/off time ratio and a given arc length, over a wide and linear, range of adjustment without the need for expensive and complicated feedback and/or power control schemes.

For maximum welding efficiency, it has been determined that the output from the Welding Power Generator (105) should have a higher ripple content than would be found in a standard alternator and that this ripple in the output should be irregular in amplitude and timing (pulsating). In this invention, this condition is achieved, by setting the switching frequency of the pulse width modulated control signal to a value which is at least 2 times, and not more than 3 times, the RPM of the Welding Power Generator. The resulting pulsating welding current produced by this invention's power generating apparatus can be transmitted over extended distances without the usual need to increase welding cable cross section to prevent power losses, and the welding arc produced by the apparatus can be easily maintained by inexperienced weldors. The quality of the welding joint produced remains good with electrode tip to weld puddle distances ranging from zero (0) inches to slightly over two (2) times the diameter of the welding rod which is being used. This is a significant improvement over the typical DC welder which requires a constant electrode tip to weld puddle distance, equal to the diameter of the welding rod which is being used, be maintained by a weldor in order to achieve acceptable results.

To further increase the invention's operational efficiency and service reliability, circuitry designed offset the effects of inductive reactance to high frequency pulse width modulation is incorporated into the design of the Power Generator Control Module Assembly (113). Power to operate the Power Generator Control Module Assembly (113) and power for the Rotor Assembly (104) is supplied by the Battery (114). However, power for the operation of these elements of the invention can be supplied by utilizing other means such as secondary alternators, or even by utilizing a portion of the Welding Power Generator's (105) output wherein the Welding Power Generator (105) is used in a self starting/self exciting mode.

The Combination Electrode Holder/Welder Control (112) combines three separate user controls with which the Power Generator Control Module (113) is controlled with a conventional style Electrode Clamp (107). The position of the Power Control Dial (109) controls the on/off ratio of the pulse width modulation signal which is sent to the Rotor Assembly (104) and it can be adjusted by the weldor at any time, while welding or while preparing to weld. The Power Button (110) is used to switch the output of the Power Generator Control Module (113) and, therefore, the Welding Power Generator, on and off. The Power Button (110) must be depressed and held in order to generate welding power. This insures maximum operator safety and also serves a critical operational function by greatly reducing the production of excessive, and potentially destructive, waste heat within the Welding Power Generator (105), a condition which occurs any time that an alternator is generating power without being electrically connected to a load. The Boost Button (108) provides a mechanism for reducing the difficulty of starting a welding arc when welding oxidized metal components or when using small diameter welding rods with lower welding currents. When the Boost Button (108) is depressed maximum welding power is generated. When the Boost Button (108) is released welding power returns instantaneously to the power previously set with the Power Control Dial (109). In other embodiments of the invention these operator controls may be reconfigured to ergonomically provide a remote control means suitable to the operator and the job to be performed. For example, foot operated welding current controls for a TIG welding system, a belt mounted welding current control mechanism for MIG welding or air gouging which incorporates on/of control within the MIG spool gun or a gouging torch. In addition to these examples, other hand controls for specialized production welding are possible as are wireless control systems (i.e., radio, digital, infrared, etc.).

Figure 2:
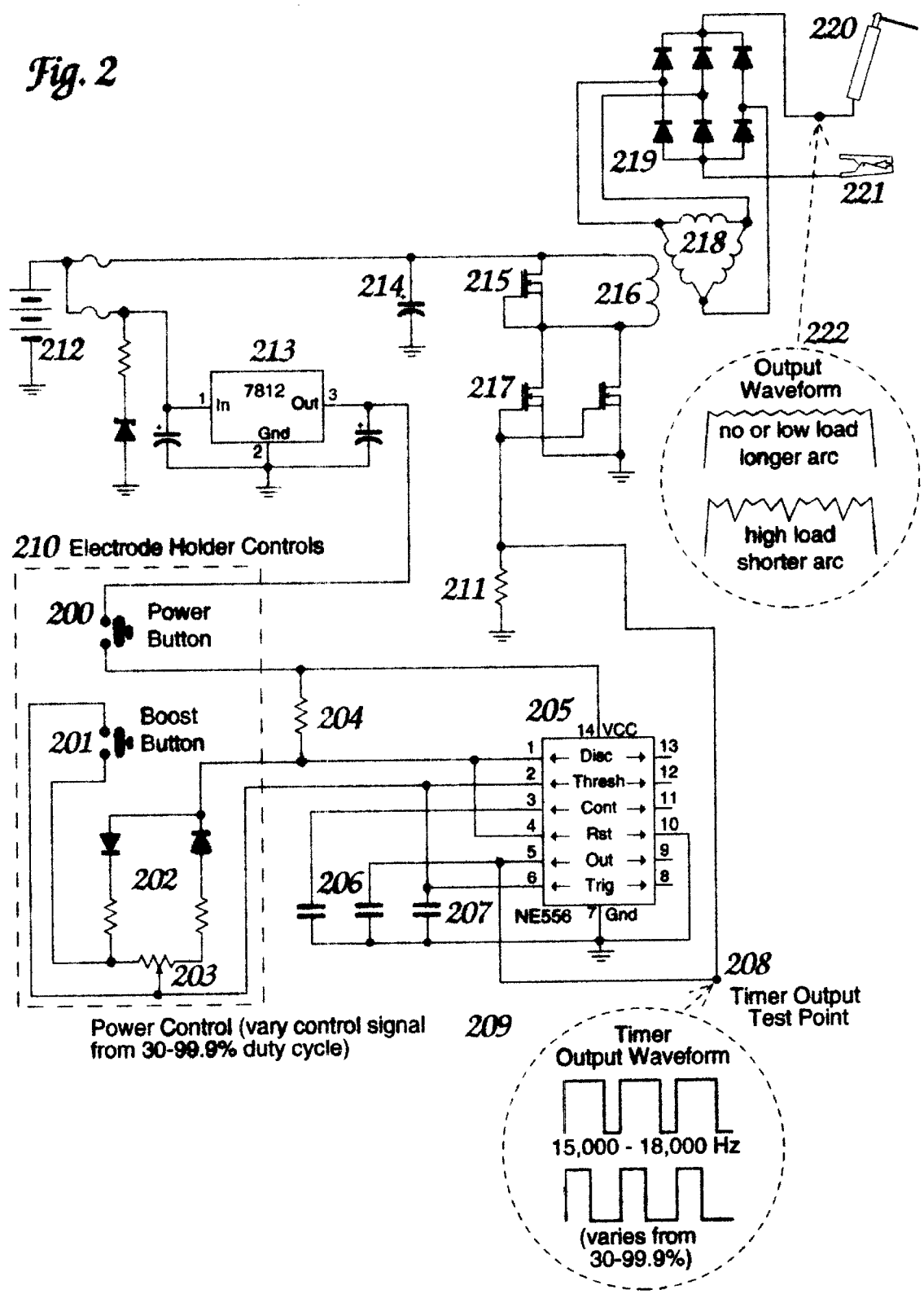
FIG. 2 is a schematic diagram of a typical embodiment of the present invention's electronic control apparatus and its power generating apparatus.

FIG. 2 shows a schematic diagram of a typical embodiment of the present invention's electronic control apparatus and its interaction with the welder's Power Generator Control Module Assembly (113). The circuit design provides complete, precise, and electrically efficient control of the power generating apparatus yet uses very few component parts.

The active components which make up the invention's power generating apparatus are a Rotor (216), a Stator (218), a Three-Phase Bridge Rectifier Assembly (219). Welding power is transmitted from the power generating apparatus to the Electrode Holder (220) and to the Ground Clamp (221) via suitably sized individual welding cables. Other than the Rotor (216) coil, no part of the power generating apparatus is connected to a ground reference point which is common to any electrical reference in the vehicle or engine to which the power generating apparatus is attached. This insures that a weldor can control welding polarity and prevents inadvertent and potentially damaging electrical current flows during welder operation.

Electrical current flow from a Battery (212) and/or a vehicle's electrical system through the invention's power generating apparatus Rotor (216) coil is controlled by N-Channel High Power, High Speed, Low Resistance MOSFET Switches (217). Because the Rotor (216) coil's electrical resistance is very low, Multiple N-Channel High Power, High Speed, Low Resistance MOSFET Switches (217) are used in parallel to insure that the voltage drop across these switches is very low in relation to the Rotor (212) coil's electrical resistance. These switches are activated by a pulse width modulated, fixed frequency, square wave generated by a simple Timer Integrated Circuit (205). A Bias Resistor (211) insures that the Multiple N-Channel High Power, High Speed, Low Resistance MOSFET Switches (217) are held "off" so that no rotor current flows during times when no signal from the Timer Integrated Circuit (205) is present. The frequency and pulse width of the switching signal which is produced is controlled by the values of a Common Timing Circuit Resistor (204), a Timing Capacitor (207), a Power Control Potentiometer (203), and a pair of resistors and diodes which make up a Dual Timing Circuit (202). Bypass Capacitors (206) insure stable operation of the Timer Integrated Circuit (205). Circuit component values are selected so that the "on" time range of the pulse width modulated square wave is from an minimum of 30% to a maximum of 99.5%.

For a given Stator (218) and Rotor (216) combination in a given alternator, and a given maximum Rotor (216) current, maximum Stator (218) output current is produced at a certain number of revolutions per minute (rpm) with no appreciable increase in Stator (218) current as Rotor (216) speed is increased beyond this point. In this invention, while welding power is being generated, Rotor (216) speed is always held at, or above, the speed at which maximum Stator (218) output is achieved. To insure optimum welding characteristics, for proper output waveform development, and to insure linear and reliable welding power output control, the output frequency of the Timer Integrated Circuit (205) portion of the invention's control circuitry is set to be equal to from two (2) to three (3) times the rotational speed, in rpm, at which maximum output power is produced when maximum rated rotor current is applied to the Rotor (216). For example, if a power generating alternator produces maximum welding power at 6,000 rpm, the output frequency of the Timer Integrated Circuit (205) would be set to from 12,000 to 18,000 Hz. Timer Output (209) at a Timer Output Test Point (208) is shown in FIG. 2.

FIG. 2 also shows the alternator/power generator welding power Output Waveform (222) which appears at the Electrode Holder (220) during no load/no arc conditions. The base ripple component of this signal has a frequency of approximately 21,000 Hz. Note, however, that as an arc is developed and current flow through the Three-Phase Bridge Rectifier Assembly (219) increases, output voltage will decrease significantly and the ripple content of the output signal will increase. Even though the output frequency of the Timer Integrated Circuit (205) is close to the frequency of the ripple current continuous synchronization of these signals will not occur. Inevitably, however, rotor current pulses will move in and out of synchronization with peak and minimum current generating cycles of the three coils which make up the Stator (218) causing significant instantaneous variations in output current which have no regular timing, even though average output current will remain the same. The pulsing effect that imparts coupled with the high frequency ripple current produced by the alternator/power generator to the output signal significantly improves welding performance and produces welds with a high degree of penetration and a marked reduction in weld impurities when compared with the output of conventional welders.

Rapidly switching electrical current to the Rotor (216) coil on and off generates very high inductive reactance from both the Rotor (216) coil and the Battery (212) supply wiring and also produces very high reverse voltage spikes which combine to reduce circuit efficiency, to potentially damage system components, and produce significant waste heat during extended periods of welder operation. A "flywheel" circuit made up of a Flywheel Circuit Capacitor (214) and a N-Channel High Power, High Speed, Low Resistance Bypass MOSFET (215) controls and eliminates the negative effects described by controlling and redirecting the negative effects of Rotor (216) and Battery (212) supply reactance by insuring continuous and unidirectional current flow though the Rotor (212) coil at all times.

Since voltage in a vehicle's electrical system can vary significantly, a simple Power Supply (213) is used to insure that the electrical components which generate critical timing and control signals work in a consistent manner and are protected by the effects of over voltage conditions which may occur during operation.

Electrode Holder Controls (210) are included in the invention design to provide significant safety features which benefit a weldor using the invention. These Electrode Holder Controls (210) also reduce a weldor's work load by eliminating the need to leave a work location to adjust welding apparatus controls.

The Power Button (200) is a normally-open push-button switch which is wired so that when it is held down/on by the weldor, it supplies electrical power to the Timer Integrated Circuit (205) and related electrical components. When the switch is released, power is removed from the Timer Integrated Circuit (205) and a Bias Resistor (111) holds the Multiple N-Channel High Power, High Speed, Low Resistance MOSFET Switches (217) in their off/high resistance mode preventing inadvertent operation of the welding power generating components. Since the Power Button (200) must be depressed and held down by an operator in order to generate welding power. The function of this control insures maximum operator safety. However, the Power Button (200) also serves a critical operational function by greatly reducing the amount of time during which the Welding Power Generator (105) must be operated in a mode wherein it is generating power without being electrically connected to a load. Operating an alternator in this manner produces excessive, and potentially destructive, waste heat within the Stator (218). More internal waste heat is produced when operating in this mode than is produced when welding at full power.

The Power Control Potentiometer (203) allows a weldor instantaneous and precise analog control of the welding current produced by the invention's power generating apparatus. This control can be adjusted before welding, or while welding, and offers a weldor unprecedented control of the welding process.

The Boost Button (201) is a normally-open push-button switch which is wired so that a weldor can instantly place the invention's power control circuitry into a maximum power mode without the need to change the setting of the Power Control Potentiometer (203). It can often be very difficult for a weldor to start a welding arc in restricted spaces, when welding thin metal components, or when welding rusty or poorly prepared metal surfaces. The Boost Button (201) provides a means for a weldor to easily start a welding arc under these difficult conditions with little risk of burning through or damaging the work piece.

Figure 3:
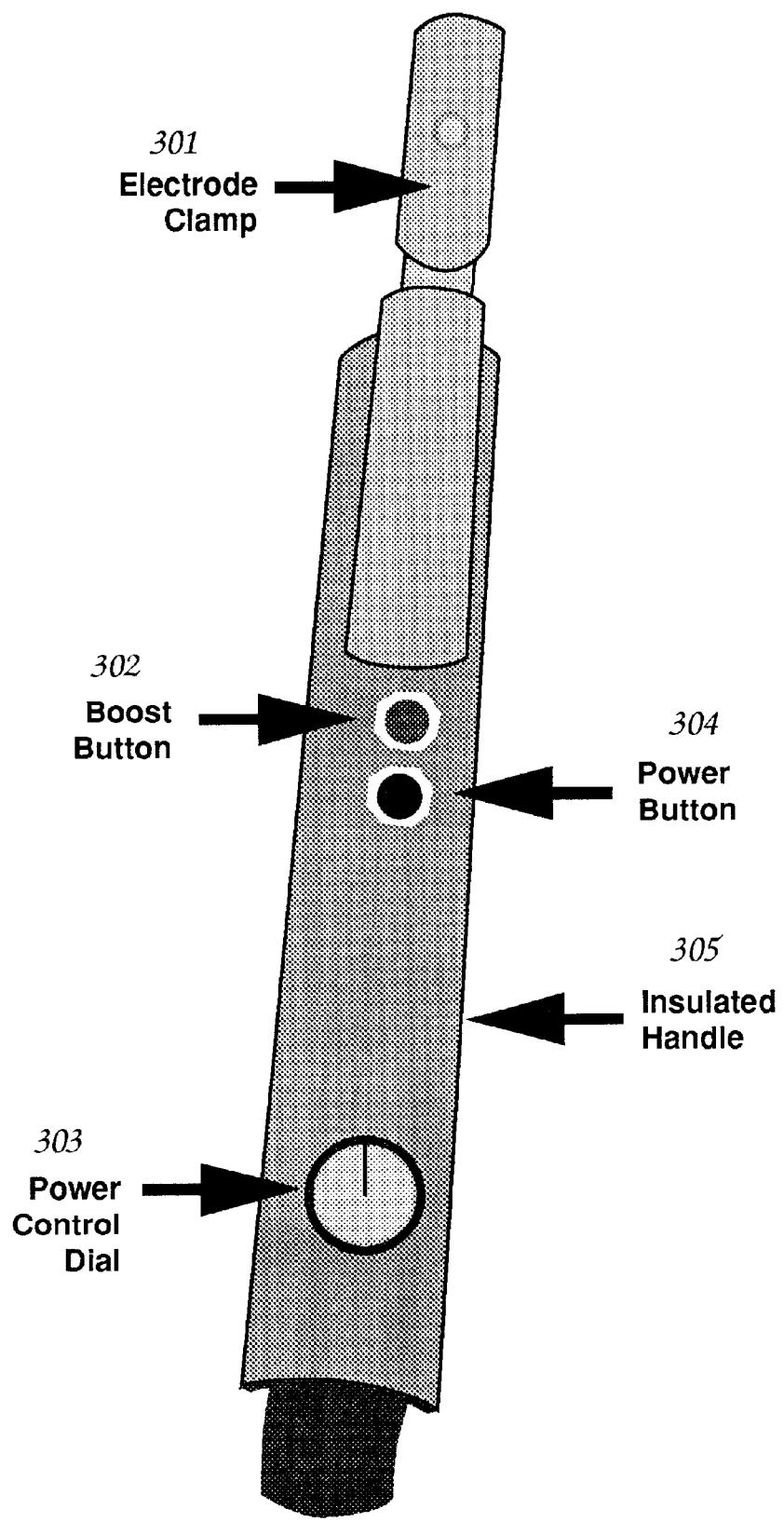
FIG. 3 is a diagram of an ergonomically designed combination electrode holder and welder operational control.

FIG. 3 shows a diagram of a typical embodiment of the present invention's ergonomically designed electronic controls.

The physical position of the Electrode Clamp (301), the Boost Button (302), the Power Button (304), and the Power Control Dial (303) on the Insulated Handle (305) are such that both left and right handed weldors can use the apparatus with equal efficiency.

The Boost Button (302) and the Power Button (304) are low profile, recessed to make them approximately level with the surrounding surface of the Insulated Handle (305) and are selected to require minimal actuation force to insure that a weldor/operator can utilize these controls over an extended period with no more physical effort than is required to grip and manipulate a conventional electrode holder which is not equipped with a complete set of welding system controls.

The Power Control Dial (303) is selected, sized, and positioned to allow a weldor to manipulate the control as may be necessary with the thumb of the gripping hand or with the fingers of their other hand.

The actuating lever of the Electrode Clamp (301) provides physical protection for the Boost Button (302), the Power Button (304), and the Power Control Dial (303) should the control handle be dropped inadvertently by the weldor.

FIG. 4 is a functional block diagram of an embodiment of the present invention in which two individually operated, and independently controlled, compact, modular, constant current DC arc welding apparatuses are attached to, and powered by, a single drive motor.

The independent components of one welding apparatus are: Welding Power Generator #1 (402), Electrode Holder/Welder Control #1 (408), Power Generator Control Module #1 (409), and Ground Clamp #1 (401). The independent components of the second welding apparatus are: Welding Power Generator #2 (404), Electrode Holder/Welder Control #2 (410), Power Generator Control Module #2 (411), and Ground Clamp #2 (405). Common components are the Drive Motor (403), the Battery (406), and its Chassis Ground Connection (407).

When the welding apparatus components are interconnected as shown in FIG. 4, and when properly connected to a suitable Drive Motor (403) they form a welding apparatus that allows two separate weldors to operate independently from each other without any interaction between the two separate welding apparatuses.

FIG. 5 is a functional block diagram of an embodiment of the present invention in which two welding power generators, controlled by a single Power Generator Control Module (506), are attached to, and driven by, a single Drive Motor (503) and are electrically interconnected to form a single welding apparatus with a welding current output which is double that of a welding apparatus consisting of only one welding power generator.

The outputs of Welding Power Generator #1 (502) and Welding Power Generator #2 (504) are connected in parallel and both welding power generators are attached to the Drive Motor (503). A Power Generator Control Module (506) controls and synchronizes the operation of these two power generating devices. Electrical power to operate the Electrode Holder/Welder Control #1 (508) and the Power Generator Control Module (506) is supplied by the Battery (506) and its Chassis Ground Connection (507).

Although the invention has been described with reference to specific embodiments, this description is not meant to be construed in a limiting sense. Various modifications of the disclosed embodiments as well as alternate embodiments of the invention will become apparent to persons skilled in the art upon reference to the description of the invention. It is therefore contemplated that the appended claims will cover any such modifications or embodiments that fall within the true scope of the invention.

What is claimed is:

1. A motor driven, modular, constant current DC (Direct Current) arc welding apparatus with Electronic Power Control Apparatus, Remote Operator Control Apparatus, and Safety Interlock comprising:

A. a single drive motor capable of driving one, or more than one, high current alternator, operating at a constant speed when welding power is being produced;

B. single, or multiple, electrically inter-connectable, forced-air or water cooled, power generating alternator modules each of which consists of a rotating electromagnet means which is coupled to, and driven by, said drive motor, producing a rotating magnetic field and generating a three (3) phase alternating current in response to the relative rotation of this magnetic field within a plurality of interconnected stationary coil windings wound around an armature;

C. a full-wave rectifier means, which may be located either internally or externally, for each power generating alternator module, used for converting the three (3) phase alternating current produced by said stationary coil windings into a direct current for welding, and which also serves to electrically isolate interconnected power generating alternator modules;

D. an electrical cable means used to connect the positive and negative DC outputs of each said full-wave rectifier means to a welding electrode and a grounding connector;

E. an electronic power control apparatus wherein a direct current pulse-width modulation means is generated and used to supply, and to control, the current flowing through the rotating electromagnet of one, or multiple, power generating alternator modules; and F. a combination electrode holder/welder control apparatus which locates operator controls, on or within, a welding electrode holder, positioned so that all controls can be operated, without fatigue or undue strain, with whatever hand, left or right, by which the operator may be griping said electrode holder and where said operator controls are comprised of a potentiometer and two momentary contact push-buttons:

1) wherein said potentiometer provides a means for instantaneously controlling and adjusting the duty cycle of said pulse width modulation means located within the electronic power control apparatus and, thereby, the welding current produced by said power generating alternator modules, which can be operated at any time, even while welding, and 2) wherein one push-button provides a means to override and replace the welding power setting determined by the position of said potentiometer, thereby providing a means for allowing an operator to instantaneously increase the current produced by the power generating alternator modules to facilitate starting a welding arc when difficult conditions are encountered and then, by releasing the push-button means, to return the power generating alternator module, or modules, instantaneously to the power setting previously determined by the potentiometer; and 3) wherein the second push-button provides a means for instantly activating or deactivating the electronic power control apparatus and, therefore, the power generating alternator module, or modules, thereby addressing three critical design elements by providing a means for:

a) switching said power generating alternator modules, or modules, on and off, and b) an operator safety interlock, by insuring that said power generating alternator module, or modules, are only activated when, and while, an operator maintains the activation of said push-button, and c) greatly limiting the production of excessive, and potentially damaging: waste heat within said stationary coil windings, which otherwise occurs whenever operating the power generating alternator module, or modules, without an electrical load.

G. an electrical interconnection means whereby electrical signals produced by said combination electrode holder/ welder control are transmitted to said electronic power control means either:

1) by a control cable means which is combined with said electrical cable means used to carry power from the power generating alternator module, or modules, to the welding electrode holder, or 2) directly by a wireless transmission means.

2. A motor-driven, modular, constant current DC (Direct Current) arc welding power supply apparatus for consumable wire feed electrode type welding (MIG) with Electronic Power Control Apparatus, Remote Operator Control Apparatus, and Safety Interlock comprising:

A. a single drive motor capable of driving one, or more than one, high current alternator, operating at a constant speed when welding power is being produced;

B. single, or multiple, electrically inter-connectable, forced-air or water cooled, power generating alternator modules each of which consists of a rotating electromagnet means which is coupled to, and driven by, said drive motor, producing a rotating magnetic field and generating a three (3) phase alternating current in response to the relative rotation of this magnetic field within a plurality of interconnected stationary coil windings wound around an armature;

C. a full-wave rectifier means, which may be located either internally or externally, for each power generating alternator module, used for converting the three (3) phase alternating current produced by said stationary coil windings into a direct current for welding, and which also serves to electrically isolate interconnected power generating alternator modules;

D. an electrical cable means used to connect the positive and negative DC outputs of each said full-wave rectifier means to a wire feed spool gun/welding electrode and a grounding connector;

E. an electronic power control apparatus wherein a direct current pulse-width modulation means is generated and used to supply, and to control the current flowing through the rotating electromagnet of one, or multiple, power generating alternator modules; and F. a combination wire spool gun/welder control apparatus which locates operator controls, on or within or near, a commercially available wire spool gun of common type which may be modified slightly to accept said operator controls, positioned so that all controls can be operated, without fatigue or undue strain, and where said operator controls are comprised of a potentiometer and two momentary contact push-buttons:

1) wherein said potentiometer provides a means for instantaneously controlling and adjusting the duty cycle of said pulse width modulation means located within the electronic power control apparatus and, thereby, the welding current produced by said power generating alternator modules, which can be operated at any time, even while welding, and 2) wherein one push-button provides a means to override and replace the welding power setting determined by the position of said potentiometer, thereby providing a means for allowing an operator to instantaneously increase the current produced by the power generating alternator modules to facilitate starting a welding arc when difficult conditions are encountered and then, by releasing the push-button means, to return the power generating alternator module, or modules, instantaneously to the power setting previously determined by the potentiometer; and 3) wherein the second push-button provides a means for instantly activating or deactivating the electronic power control apparatus and, therefore, the power generating alternator module, or modules, thereby addressing three critical design elements by providing a means for:
   a) switching said power generating alternator modules, or modules, on and off, and
   b) an operator safety interlock, by insuring that said power generating alternator module, or modules, are only activated when, and while, an operator maintains the activation of said push-button, and
   c) greatly limiting the production of excessive, and potentially damaging, waste heat within said stationary coil windings, which otherwise occurs whenever operating the power generating alternator module, or modules, without an electrical load.

G. an electrical interconnection means whereby electrical signals produced by said combination wire spool gun/welder control apparatus are transmitted to said electronic power control means either:
   1) by a control cable means which is combined with said electrical cable means used to carry power from the power generating alternator module, or modules, to the wire spool gun electrode, or
   2) directly by a wireless transmission means.

3. A motor-driven, modular, DC (Direct Current) arc welding power supply apparatus for non-consumable electrode type welding applications with Electronic Power Control Apparatus, Remote Operator Control Apparatus, and Safety Interlock comprising:

A. a single drive motor, where said drive motor may be an internal combustion engine, a hydraulic motor, a pneumatic motor, a water wheel, a wind mill, a steam or water driven turbine, or an electric motor capable of driving one, or more than one, high current alternator, operating at a constant speed when welding power is being produced;

B. single, or multiple, electrically inter-connectable, forced-air or water cooled, power generating alternator modules each of which consists of a rotating electromagnet means which is coupled to, and driven by, said drive motor, producing a rotating magnetic field and generating a three (3) phase alternating current in response to the relative rotation of this magnetic field within a plurality of interconnected stationary coil windings wound around an armature;

C. a full-wave rectifier means, which may be located either internally or externally, for each power generating alternator module, used for converting the three (3) phase alternating current produced by said stationary coil windings into a direct current for welding, and which also serves to electrically isolate interconnected power generating alternator modules;

D. an electrical cable means used to connect the positive and negative DC outputs of each said full-wave rectifier means to a non-consumable electrode type welding torch and a grounding connector;

E. an electronic power control apparatus wherein a direct current pulse-width modulation means is generated and used to supply, and to control, the current flowing through the rotating electromagnet of one, or multiple, power generating alternator modules; and F. a welding power control apparatus which locates operator controls, on or within or near, a commercially available torch equipment appropriate to the type of welding desired which may be modified slightly to accept said operator controls, positioned so that all controls can be operated, without fatigue or undue strain, and where said operator controls are comprised of a potentiometer and two momentary contact push-buttons:
   1) wherein said potentiometer provides a means for instantaneously controlling and adjusting the duty cycle of said pulse width modulation means located within the electronic power control apparatus and, thereby, the welding current produced by said power generating alternator modules, which can be operated at any time, even while welding, and
   2) wherein one push-button provides a means to override and replace the welding power setting determined by the position of said potentiometer, thereby providing a means for allowing an operator to instantaneously increase the current produced by the power generating alternator modules to facilitate starting a welding arc when difficult conditions are encountered and then, by releasing the push-button means, to return the power generating alternator module, or modules, instantaneously to the power setting previously determined by the potentiometer; and
   3) wherein the second push-button provides a means for instantly activating or deactivating the electronic power control apparatus and, therefore, the power generating alternator module, or modules, thereby addressing three critical design elements by providing a means for:
      a) switching said power generating alternator modules, or modules, on and off, and
      b) an operator safety interlock, by insuring that said power generating alternator module, or modules, are only activated when, and while, an operator maintains the activation of said push-button, and
      c) greatly limiting the production of excessive, and potentially damaging, waste heat within said stationary coil windings, which otherwise occurs whenever operating the power generating alternator module, or modules, without an electrical load.

G. an electrical interconnection means whereby electrical signals produced by said operator controls are transmitted to said electronic power control means either:
   1) by a control cable means which is combined with said electrical cable means used to carry power from the power generating alternator module, or modules, to the wire spool gun electrode; or
   2) directly by a wireless transmission means.

4. En infinitely adjustable linear control means for a motor-driven alternator apparatus used to produce a welding current which remains constant for any given output power point and welding load, even if motor speed varies significantly during operation, and which requires no electrical or mechanical output power feedback or current sensing mechanism for stable operation, comprising:

A. an electronic power control apparatus wherein a direct current pulse-width modulation means, with a repetition frequency of at least 10,000 Hz, and a duty cycle ranging from 30 to 100%, is generated and used to supply, and to control, the current flowing through the rotating electromagnet of a motor-driven alternator apparatus; and B. a motor-driven alternator apparatus which consists of a rotating electromagnet means which is coupled to, and driven by a drive motor, producing a rotating magnetic field and generating a three (3) phase alternating current in response to the relative rotation of this magnetic field within a plurality of interconnected stationary coil windings wound around an armature; and C. a full-wave rectifier means used for converting the three (3) phase alternating current produced by said stationary coil windings into a direct current for welding; and D. where the said motor-driven alternator apparatus is operated, at all times when welding power is desired, at a speed at, or above, the speed at which maximum (4 output current for a given rotor and stator combination is reached.

5. The welding power control means for a motor driven alternator apparatus of claim 4 wherein the repetition frequency of the pulse width modulation means used in the electronic power control apparatus is adjusted, to generate a pulsating ripple component which significantly improves welding characteristics, by setting it to a frequency that is two (2) to three (3) times the rotational speed at which 100% output power is attained.

* * * * *